(No Model.) 6 Sheets—Sheet 1.
F. W. OSTROM.
BUTTON HOLE SEWING MACHINE.
No. 303,453. Patented Aug. 12, 1884.
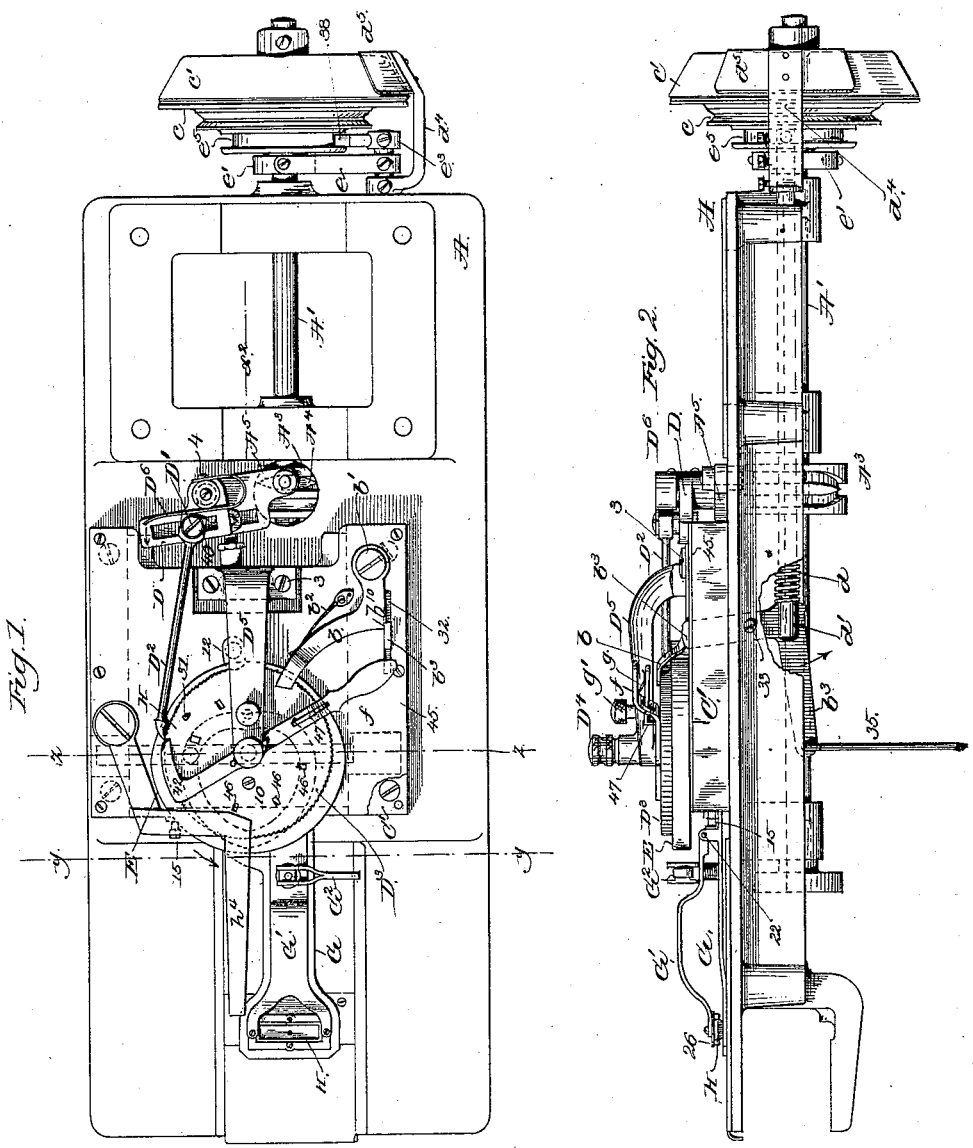

(No Model.)   6 Sheets—Sheet 2.

F. W. OSTROM.
BUTTON HOLE SEWING MACHINE.

No. 303,453.  Patented Aug. 12, 1884.

(No Model.) 6 Sheets—Sheet 3.
F. W. OSTROM.
BUTTON HOLE SEWING MACHINE.
No. 303,453. Patented Aug. 12, 1884.
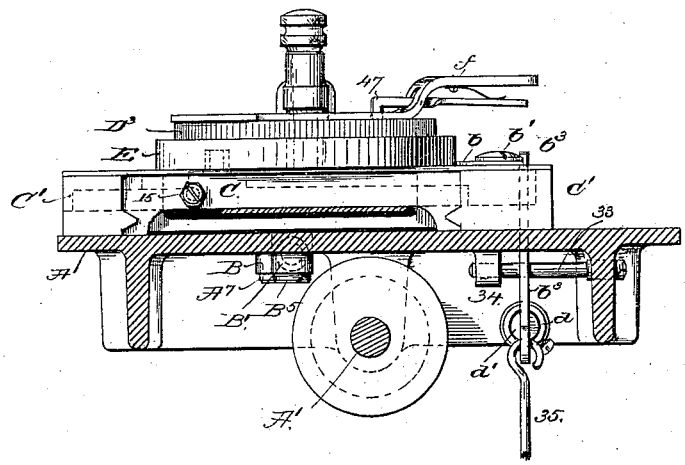
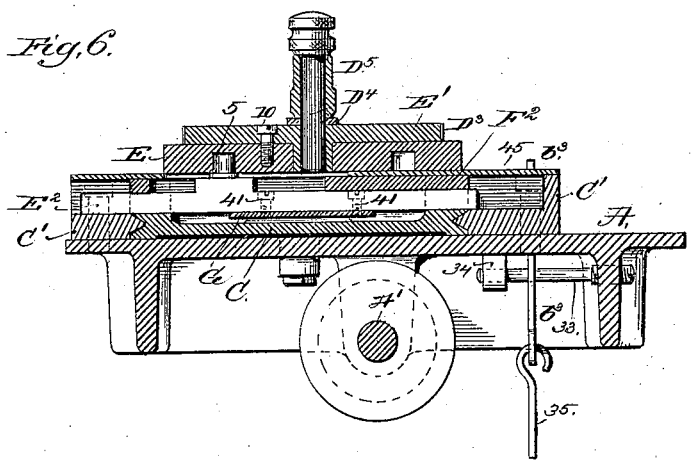
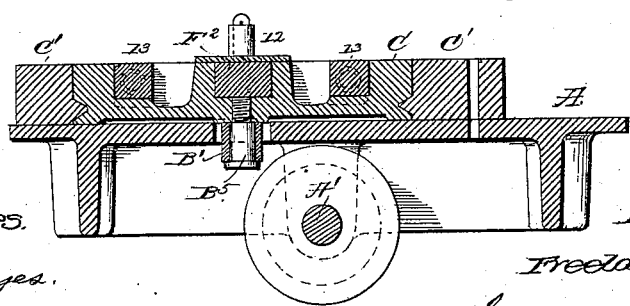

(No Model.) 6 Sheets—Sheet 4.
F. W. OSTROM.
BUTTON HOLE SEWING MACHINE.
No. 303,453. Patented Aug. 12, 1884.
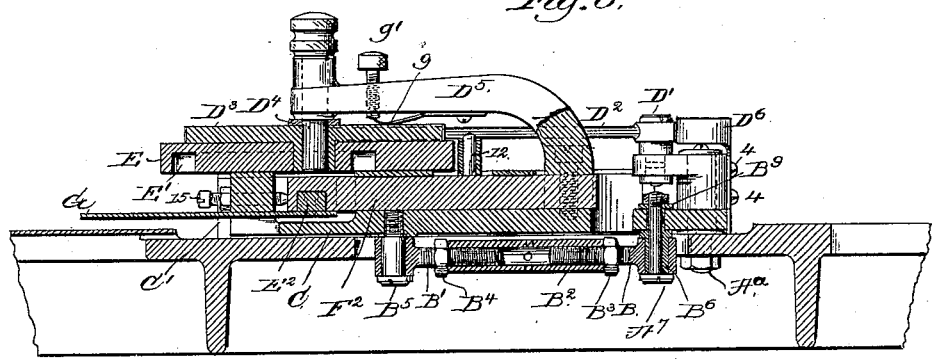
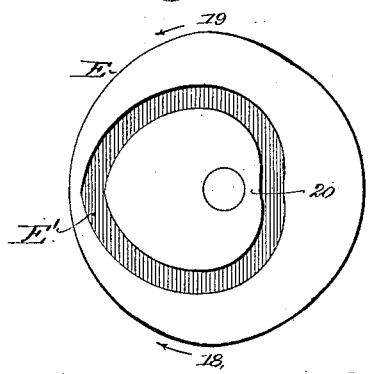
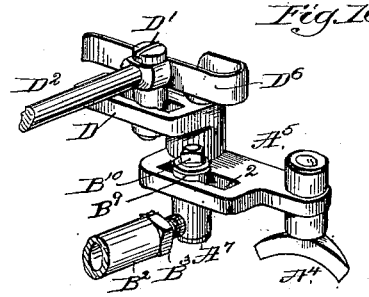
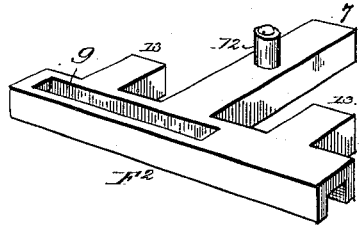
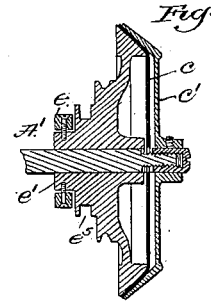
Witnesses:
B. J. Noyes.
John F. C. Pinkert
Inventor:
Freeland W. Ostrom.
by Crosby & Gregory, attys.

(No Model.) 6 Sheets—Sheet 5.
F. W. OSTROM.
BUTTON HOLE SEWING MACHINE.
No. 303,453. Patented Aug. 12, 1884.
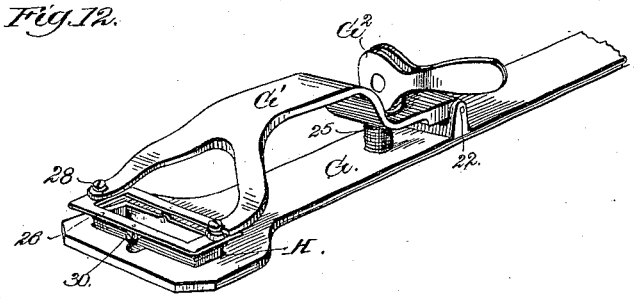
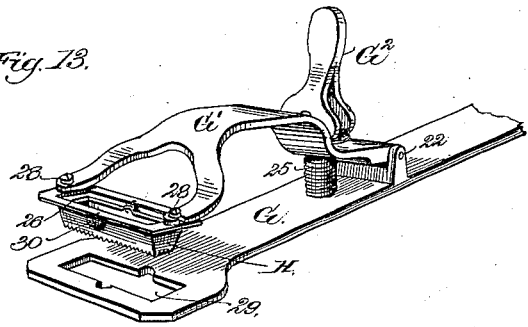
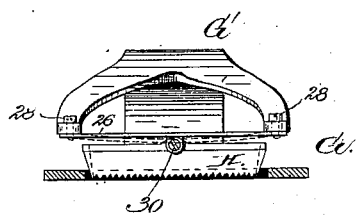
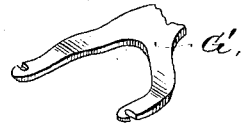
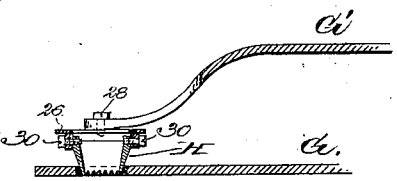
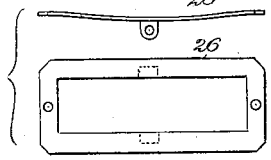
Witnesses
B. J. Noyes.
John F. C. Preinkert
Inventor
Freeland W. Ostrom
by Crosby & Gregory
attys.

(No Model.) 6 Sheets—Sheet 6.
F. W. OSTROM.
BUTTON HOLE SEWING MACHINE.
No. 303,453. Patented Aug. 12, 1884.
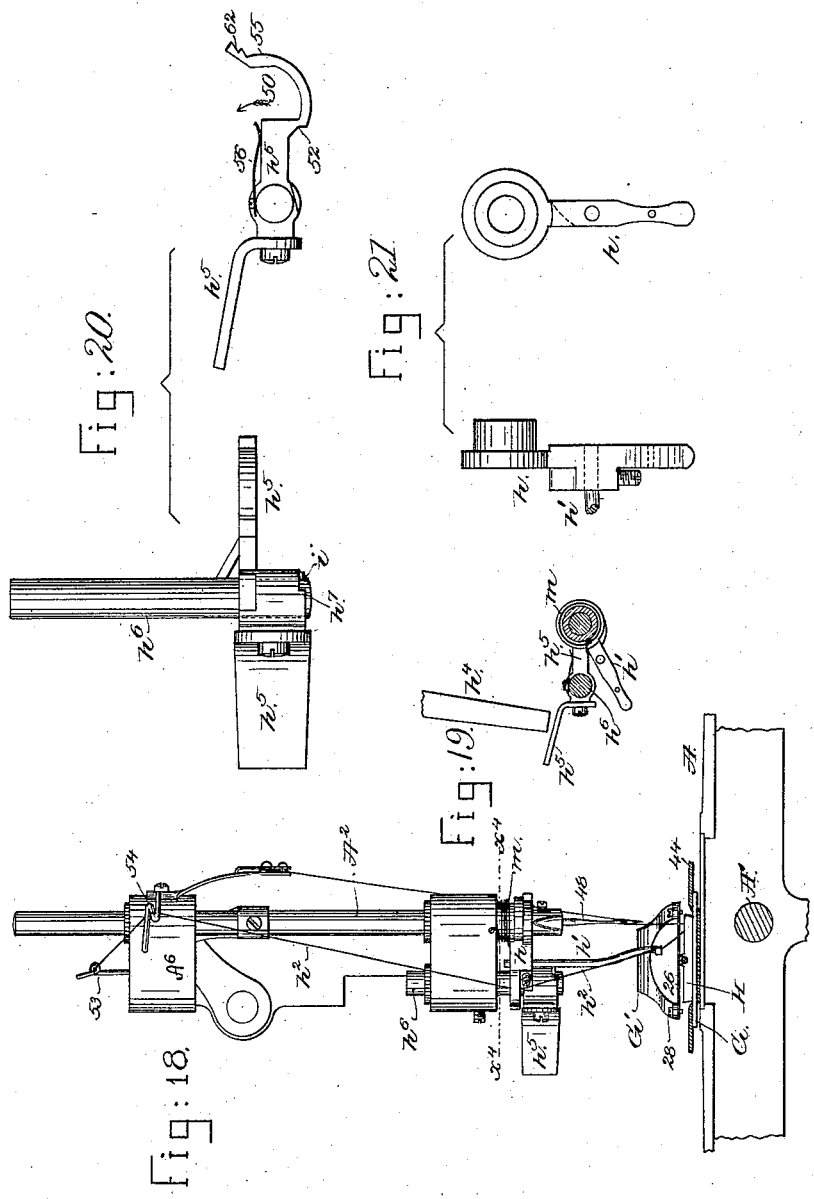
Witnesses.
B. J. Noyes.
John F. C. [illegible]
Inventor.
Freeland W. Ostrom
by Crosby Gregory
attys

UNITED STATES PATENT OFFICE.

FREELAND W. OSTROM, OF TROY, NEW YORK, ASSIGNOR TO THE WHEELER & WILSON MANUFACTURING COMPANY, OF BRIDGEPORT, CONNECTICUT.

BUTTON-HOLE SEWING-MACHINE.

SPECIFICATION forming part of Letters Patent No. 303,453, dated August 12, 1884.

Application filed July 30, 1883. (No model.)

*To all whom it may concern:*

Be it known that I, FREELAND W. OSTROM, of Troy, county of Rensselaer, State of New York, have invented an Improvement in Button-Hole Sewing-Machines, of which the following, taken in connection with the accompanying drawings, is a specification, like letters on the drawings representing like parts.

This invention is an improvement on that described in application No. 63,023, filed June 1, 1882, and has for its object to simplify the construction and operation of the same.

Figure 3:
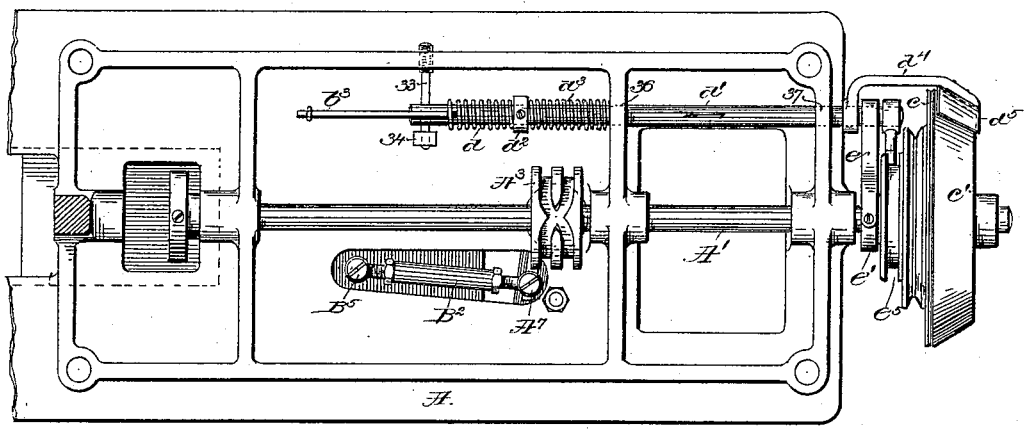
Figure 4:
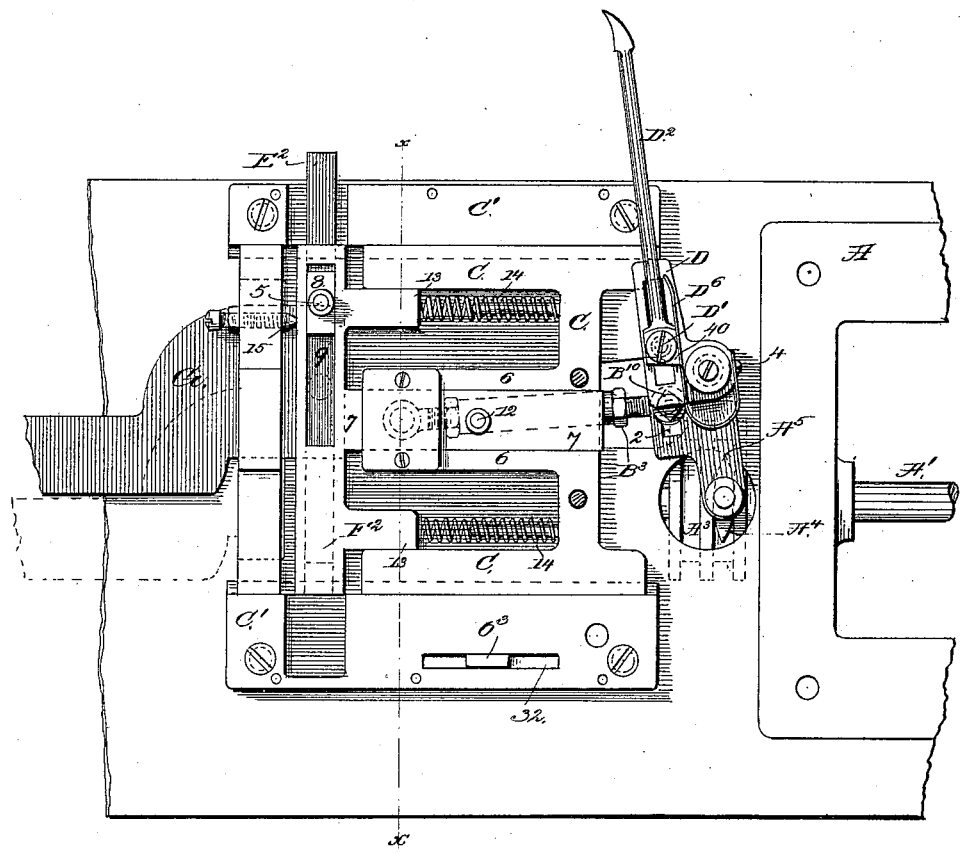

Figure 1 is a plan or top view of a Wheeler & Wilson No. 10 machine with my improvements added, the overhanging arm and parts carried in it being removed from the bed-plate; Fig. 2, a side elevation of Fig. 1; Fig. 3, an under-side view of Fig. 1; Fig. 4, an enlarged detail of the frame of the attachment with its neck, cam-wheel, ratchet, and the cover-plate removed to clearly show the cross-slides; Fig. 5, a cross-section on the dotted line $y\, y$, Fig. 1; Fig. 6, a cross-section on the dotted line $z\, z$, Fig. 1, but with the central member of the cross-slide in elevation; Fig. 7, a cross-section on the line $x\, x$, Fig. 4; Fig. 8, a longitudinal section in the plane of the line $x^2$, extended, Fig. 1; Fig. 9, an under-side view of the cam-wheel removed; Fig. 10, a detail of the devices for regulating the length of the over-stitch and the spacing of the same around the button-hole slit. Fig. 11 is a top view of the outer of the cross-slides; Figs. 12 to 17, inclusive, details of the cloth-clamp. Fig. 18 represents parts of the head of the machine with the attached corder to deliver a cord along the edge of the button-hole slit under the needle-thread, the said figure showing the cloth held in the clamp; Fig. 19, a partial section of Fig. 18 on the dotted line $x^4$, to show the corder-holding lever and part of the releasing-lever; Fig. 20, a side elevation and plan view of the corder-holding lever and its pivot detached and enlarged; Fig. 21, a detail showing the carrier for the cord-guide; and Fig. 22, a section of the fast and loose pulleys, the brake, and means for moving the loose pulley.

I have selected a Wheeler & Wilson No. 10 machine upon which to embody my invention, and, referring to the drawings, the framework A, main driver-shaft A', and needle-bar $A^2$ and head $A^6$ (shown only in Fig. 18) are all as in that machine, the shaft A' operating the usual hook-shaft and hook. Upon the shaft A', I have fastened a switch-cam, $A^3$, which receives a follower, $A^4$, pivoted upon the free end of the overstitch regulating-lever $A^5$, pivoted at A, Fig. 8, upon the bed-plate, the latter having a hole cut through it for the passage of the follower, and also for the passage up through it of the studs $A^7$ and $B^5$, by which the ends of a connecting-rod to be described are adjustably joined with the overstitch regulating-lever and a reciprocating frame, C. The said connecting-rod is composed of two screws, B B', having bored heads, and screwed into opposite ends of a turn-sleeve, $B^2$, the said screws and sleeve, when properly adjusted as to length, being confined together by jam-nuts $B^3\ B^4$. The bored head of the screw B' receives a screw-stud, $B^5$, by which to attach it to the reciprocating frame C of the attachment to be described. The bored head of the screw B has placed on it a shouldered sleeve, $B^6$, (see Fig. 8,) and the screw-stud $A^7$ is then extended up through the said shouldered sleeve and through a shorter shouldered sleeve $B^9$, placed in the slot 2 of the overstitch regulating-lever $A^5$, Figs. 9 and 10, where the screw-stud has applied to it a nut, $B^{10}$. The shoulders of the said sleeves rest against the under and upper sides of the said lever $A^5$, thus enabling the said lever, by the turning of the screw-stud or a nut, to be firmly clamped between the shoulders of the sleeves. The sleeve $B^6$ thus receives all the wear of the connecting-rod.

The lever $A^5$, as herein shown, serves as the carrier for a slotted arm, D, which has adjustably connected with it by a screw-stud, D', a pawl, $D^2$, the outer end of which engages the teeth of and rotates, intermittingly, the ratchet $D^3$, mounted loosely on the stud or pin $D^4$, inserted loosely down through the hole in the head of the neck $D^5$, attached by suitable screws, 3, to the reciprocating frame C. The head 40 of the said pawl, or that part of it about the stud D', is beveled, as shown in Figs. 1 and 4, and its beveled part is acted upon by a steel spring, $D^6$, attached to arm D by screws 4, Fig. 8. When the arm D is moving in the direction of the arrow at its outer end, Fig. 1, the said spring acts against the outer corner of the beveled head of the said pawl and keeps the point of the pawl pressed closely into the teeth of the ratchet-wheel and gradually presses the point of the pawl closer and closer into contact with the said teeth, for the stud D is then moving, it will be understood, in the arc of a circle toward the center of the ratchet. In the backward movement of the arm D and pawl the pressure of the spring D⁶ is released gradually, thus relieving the friction between the point of the pawl and ratchet. When the pawl is to be thrown out of action, as when changes are being made in the mechanical parts, it will be turned back into the position shown in Fig. 4, and the spring will act upon a flat side of the head of the pawl in the manner of a jack-knife, and will hold the pawl back. The adjustment of the pawl D² on the arm D will operate to turn the ratchet D³ a greater or less distance, and the latter, having attached to it the cam-wheel E, the under face of which, as herein shown, has a heart-cam groove, E′, will cause a greater or less movement of reciprocation lengthwise of the inner bar, E², of the cross-slides E² F², the said bar E² having a stud, 5, preferably provided with a roller, which enters the said heart-cam groove E′. (See Fig. 6.)

The lower member, G, of the cloth-clamp is connected directly with the under side of the bar E² by screws 41, as shown in dotted lines, Fig. 6, and consequently, as the said bar E² is moved longitudinally by the heart-cam, each movement of the said cam will space the overseaming-stitches more or less distant, or feed the cloth or material along under the needle in the direction of the length of the button-hole slit. Button-holes of different lengths require heart-cams of different sizes, so each machine will be provided with a set of cam-wheels of like diameter, but having heart-shaped cams of different sizes.

The reciprocating frame C has at its edges >-shaped grooves to fit <-shaped ways C′, attached to the bed, one of them, in practice, being adjustably attached to the bed, to compensate for wear in the sliding frame. The reciprocating frame C has a central part, 6, in which is a guideway to receive the shank 7 of the outermost cross-slide F², grooved at its under side and mortised for the reception of the inner cross-slide E², before described, a projection, 8, thereon, entering a groove, 9, made through the top of the outer slide, F², to aid in guiding the inner cross-slide, E², correctly.

As herein shown, the cam-wheel E is slipped over the hub of the ratchet-wheel, and the two wheels are united by a screw, 10. The outer cross-slide, F², at its upper side, has a roller-stud, 12, and lugs 13 of the said outer slide are guided by portions of the sliding frame C, (see Fig. 4,) and are acted upon by springs 14, shown as spiral springs, which normally keep the front side of the said outer frame pressed toward an adjustable stop, 15, shown as a screw inserted through a part of the reciprocating frame C, and the said springs keep the said outer slide pressed against the said stop, except when the said slide is pressed away from the said stop and against the action of the said springs by the truly circular portion of the periphery of the cam-wheel E, which at such times acts against the roller-stud 12. As the inner slide is moved in the direction of its length by reason of the outer slide, which embraces it, the cloth-clamp is also moved in unison with it; and from the foregoing description it will be seen that the slide-plate has a uniform reciprocation for a greater or less distance, to move all the parts connected by it and the cloth laterally under the needle, between the time that the needle rises from the cloth and again reaches the same in its descent; and it will also be understood that the cross-slides have an independent lateral motion in the same direction within the slide-plate.

To start a button-hole, it will be supposed that the stud 5 rests in the groove of the heart-shaped cam near the point of the same, and that the said point is away from the operator, and that the pin 5 is farthest away from the operator, and the needle is in place to descend through the space in the foot of the clamp and in the slotted end thereof next the operator. As the cam-wheel and heart-cam are now rotated toward the left, (see Fig. 1,) to overstitch the right-hand side of the button-hole from the end nearest the operator to the end farthest from the operator, the pin 5 will be gradually drawn in toward the heel 20 of the heart. (See Fig. 9.) The acting periphery of the cam-wheel E from the point 18 to the point 19, in the direction of the arrows, Fig. 9, is a true circle, and when, as herein shown, the circular part of the said cam-wheel fails to act against the roller-stud 12, as when the right-hand side of the button-hole slit is being stitched, the outer cross-slide, F², is held against the stop 15 by the springs 14, in which position of the parts the overstitching is all at the right-hand side of the button-hole slit; but as soon as the heel of the heart-cam reaches the roller-stud 5 and the cloth has been carried farthest toward the operator, the truly circular part of the cam-wheel or the inclined portion of the cam-wheel leading up to its truly circular part comes into position and acts upon the roller-stud 12, causing it to be moved laterally away from the line of feed, drawing with it the outer cross-slide, and the latter carries with it the inner cross-slide and the pin 5 attached to it, and the cloth-clamp is also moved laterally for a distance sufficient to place it in such position with relation to the needle of the machine that the lateral movements of the sliding frame and the cross-slides within it will insure the penetration of the needle through the cloth at the left-hand or opposite side of the button-hole slit, the circular part of the cam-wheel continuing to act against the stud 12 until the end of the button-hole has been reached by the needle, when the stud 12 gradually descends down along the incline, joining the truly circular part of the cam-wheel with that part of it which is cut away until the outward cross-slide has been moved far enough by the springs 14 to place the outer side of the outer cross-slide against the stop 15, at which time the pin 5, acted upon by the heart-cam, has again reached its starting-point, or the point of the heart-cam.

The finished button-hole has its ends barred. The so-called "bar" consists of stitches joining the stitches which have been described as having been made at each side of the button-hole slit. This was done as follows, viz: as the incline in advance of the truly circular part of the cam-wheel acted against the stud 12, preparatory to the said stud being held back by the said truly circular part, the cross-slides were moved so as to cause the clamp to carry the cloth laterally far enough to change the stitching from the right-hand to the left-hand side of the center line of the button-hole slit, the length of the incline determining the number of stitches during such lateral movement, and consequently the number of stitches in the bar. When the stud 12 rode down or off the opposite end of the truly circular part, the opposite end of the button-hole was stitched in like manner to bar it. The cloth-clamp, which holds the cloth while it is being moved under the needle, both in the direction of the length of the button-hole slit by the heart-cam, and laterally with relation to the said slit, as described, is composed of the under plate or jaw, G, and an upper jaw, G'. (Shown as pivoted at 22.) These two jaws are composed of rigid stiff steel. The upper jaw is forced toward the lower jaw by the eccentric-lever $G^2$, pivoted on a post screwed into the under jaw and passed through a spiral spring, 25, which, located below the upper jaw, lifts the latter, when the lever $G^2$ is in position to permit the jaw to rise, as in Fig. 13, when the work is to be introduced or removed. The outer end of the jaw G' is forked, and has connected with it an open spring-plate, 26, which, in its normal condition is curved in the direction of its length, as shown in Fig. 16. The ends of the spring-plate are secured to the forked ends of the jaw G' by screws 28, passed through elongated holes (see Fig. 17) in the said jaw, and screwed into the ends of the said plate.

The foot H, shown as a rectangular frame having inclined sides and ends, has an opening through it longer and wider than the longest button-hole to be worked. The under side of the foot is serrated to bear upon the surface of the cloth 44 under it, and forces the cloth down through the opening 29 in the jaw G against the throat-plate of the machine. The foot H is pivoted centrally on the spring-plate 26 by the screws 30. As the eccentric lever is turned to force the jaw G' and foot H down firmly against the cloth, the foot comes to a bearing on the cloth, and as the jaw is further forced down, the spring-plate, under strain, straightens in proportion to the power put upon it by the said lever, yet the foot is always held down by a yielding pressure, the pivots 30 and the movement of the screws 28, in the slots of the jaw G', enabling the foot to bear uniformly upon the material.

When the button-hole slit has been finished, the stitching mechanism should be automatically stopped. To do this I have provided the upper side of the ratchet-wheel $D^3$ with a pin, 31, which, on the completion of the button-hole, as described, strikes against the end of a releasing device, $b$, pivoted at $b'$, and acted upon by a spring, $b^2$, which normally keeps the said releasing device with its shoulder $b^{10}$ extended across the slot 32, in which rests the shipper-lever $b^3$, the releasing device holding the said lever, as in Figs. 1, 2, 3, when the button-hole slit is being worked. The lever $b^3$ is pivoted on a pin, 33, screwed through a rib of the bed-plate into an ear, 34, of the bed-plate. The end of the lever $b^3$ below the bed-plate has connected with it a link, 35, which is joined to a foot-treadle, so that the operator, by pressing on the treadle, can turn the said lever, in the direction of the arrow near it in Fig. 2, to cause the rounded heel of the said lever to effect the engagement of the loose pulley $c$, scored for the reception of the driving-belt with the interior of the fast pulley $c'$ on the shaft A', there being between the conical faces of the said pulley a suitable washer. The heel of the lever $b^3$, Fig. 2, acts directly upon a spiral spring, $d$, surrounding the slotted end of the shipper-rod $d'$, and having its other end placed against an adjustable shoulder, $d^2$, Fig. 3, attached to the shipper-rod. This rod, extended through a spiral spring, $d^3$, and through suitable bearings at 36 37, has fastened to it in an adjustable manner, first, the sleeve of an arm, $d^4$, provided with a suitable friction plate or surface, $d^5$, to act against the fast-pulley, and, second, a forked arm, $e$, having pivoted between its forked ends the friction-plate $e'$, through which is a hole of a little larger diameter than that of the shaft A', so that the said arm, as the rod $d'$ is moved in the direction of the arrow on it, Fig. 3, will cause the outer face of the said plate to press against the inner face of the loose pulley and force its opposite coned face closely against the inner side of the fast pulley, so as to rotate it and the main shaft; and next on the said rod is secured a finger, $e^2$, Figs. 1 and 2, having at its end a roller, 38, which enters an annular groove, $e^5$, made in the hub of the loose pulley $c$. When the slide-rod is moved in the direction of the said arrow, Fig. 3, the finger $e^2$ has no effect; but as soon as the lever $b^3$ is released the spiral spring $d^3$, acting against the right-hand side of the shoulder $d^2$, causes the said finger $e^3$ to act against one of the walls of the annular groove $e^5$ and draw the loose pulley from contact with the fast pulley, and at the same time the brake is applied to the fast pulley by a power determined by the strength of the said spring $d^3$. The spring $d$ is heavier and stiffer than the spring $d^3$, but it is of such length with relation to the movement of the lever $b^3$ that the latter has no effect upon the spring $d$ when the brake is applied, and the lever $b^3$ is not held by the releasing device $b$; but as soon as the lever $b^3$ is turned to compress the spring $d$, it acts to gradually compress the same until the power exerted upon it and the shoulder $d^2$ is sufficient to overcome the pressure of the spring $d^3$, thus releasing the brake, and thereafter, in its further compression, moving the rod $d^3$ and forcing the loose pulley against the fast pulley.

Sometimes it is desirable to turn the ratchet-wheel $D^3$ independently of the pawl $D^2$. To do this I have provided the upper side of the said ratchet-wheel with a series of notches, 46, which may be engaged by a latch, 47, of a hand-lever, $f$, having its fulcrum on the stud $D^4$, the said hand-lever at its opposite end having a pawl-lifter, 42, (see Fig. 1,) by which to disengage the said pawl from the teeth of the ratchet-wheel, when the said hand wheel is to be turned backward by the hand-lever and its latch. To prevent the ratchet-wheel from overrunning, its face is acted upon by a suitable friction spring or plate, $g$, acted upon by a screw, $g'$, to vary its pressure.

To cord the edge of the button-hole slit, or provide it with a cord under the needle-thread, to finish the edge, I have provided the machine with a cording mechanism. Referring to the drawings, Figs. 18 to 21, showing the said cording mechanism, $h$, represents a carrier, to which is attached a cord-guide, $h'$, having an eye through which the cord $h^2$ is passed down to the cloth. One end of this carrier has a hub to embrace the needle-bar $A^2$, so that the center of motion of the said carrier shall be coincident with the axis of the needle 48, in order that the said carrier and the cord-guide attached to it may be revolved sufficiently about the needle to place the lower end of the thread-guide at the rear of the needle when the cloth-clamp is feeding the cloth toward the operator, and in front of the needle when the cloth-clamp is feeding the cloth away from the operator. To effect these changes in the position of the cord-guide, with relation to the needle and the direction of the feed of the cloth, I have pivoted upon the guideway $C'$, or it may be on the top plate, 45, or other suitable spot, a lever, $h^4$, (shown only in Fig. 1, and partly in Fig. 19,) which lever, when struck by the pin 31 or other suitable pin, is moved, so that it acts upon one end of and turns a latch-lever or device, $h^5$, pivoted upon a suitable rod or bar, $h^6$. When this lever $h^5$ is turned in the direction of the arrow 50, Fig. 20, such movement of the said lever releases the carrier $h$ from its shoulder 52, which is done as the needle reaches the center or central bar-stitch of the rear or farther end of the button-hole. The spring $m$, fastened to the said carrier, and held at its other end, acts to throw the said carrier about the needle-bar and needle as a center, and the carrier so acted upon is moved to occupy a position with relation to the needle, substantially such as it occupied when the first side of the button-hole slit was being stitched.

I believe myself to be the first to invent and apply to a button-hole stitching-machine a cord-guide which may be reversed in position with relation to the needle, and may be turned about the axis of the needles in one and then back in the other direction; and to do this I have herein shown the movement as accomplished in one direction by a spring, and in the other direction the operator will turn the carrier by hand; so I do not desire to limit this feature of my invention to any particular mechanism for moving the cord-guide or its carrier. The cord will be taken from a suitable spool held on a suitable spool-pin on the overhanging arm of the machine or otherwise, and subjected to suitable tension. The said cord will be led through suitable guide-eyes, 53 54, to and through the eye in the cord-guide. The lower side of the hub of the carrier is supported vertically by the arm 55 of the latch-lever $h^5$. This lever, as herein shown, has its hub notched, as shown in Fig. 20, to receive a pin, $i$, driven into the bar $h^6$, and the shoulder $h^7$ of the hub is normally kept pressed against the said pin by a spring 56.

The cam-groove $E'$ is not in shape exactly as usual in heart-cams, for a regular heart-cam, as ordinarily understood in mechanics, would not give sufficient dwell to the cross-slides at the ends of the button-hole slit to permit the ends to be barred. To give this cam the proper shape to enable the end of the slit to be barred I have thickened it at the heel, and from the said thickened heel it has been gradually curved each way to the point of the heart, thus making the same of greater radius than usual between the point and heel.

I have herein shown the cam-wheel as provided with the heart-cam; but, if desired, a disk containing the heart-cam might be attached to the under side of the cam-wheel.

The end 62 of the lever $h^5$ acts as a stop for the carrier-arm and cord-guide when thrown into position after it is released from the position Fig. 18.

I claim—

1. The reciprocating plate C and the outer cross-slide, $F^2$, provided with extensions 13 and 7, to aid in guiding the said slide in right line, and with a stud, 12, and the inner cross-slide fitted to the outer cross-slide, and having a stud, 5, combined with the heart-cam and the cam-plate, to act, respectively, upon the studs 5 and 12, and with means to reciprocate the sliding plate and rotate the cam-wheel, substantially as described.

2. The reciprocating plate C, the cam-wheel, heart-cam, and ratchet-wheel mounted upon one common stud, D⁴, combined with the lever A⁵ and arm D having a common fulcrum, and with a connecting-rod, and a pawl adjustably joined respectively with the said lever and arm, substantially as described.

3. The cross-slides, their studs 12 and 5, the ratchet-wheel, cam-wheel provided with heart-cam groove and the reciprocating plate combined with the arm D, its connected pawl having the beveled head shaped as set forth, and with the spring to act upon the head of the said pawl to press its point into the ratchet-teeth harder at the forward movement of the arm and pawl than at its backward movement, and means to operate the same, substantially as described.

4. The switch-cam and lever A⁵, actuated thereby, the sliding plate C, the cross-slides, and cloth-clamp connected with the inner cross-slide, combined with the connecting-link made longitudinally adjustable to place the cloth-clamp correctly under the needle, substantially as described.

5. The combination of reciprocating plate C, the two cross-slides fitted therein, the spring to move the cross-slides in one direction, the stop 15 to arrest the outer cam-slide, and means to reciprocate the reciprocating plate, and with the cam-wheel and heart-cam, the former to operate against the stud on the outer cross-slide while stitching one-half and two ends of the button-hole, and the latter to move the inner cross-slide and its attached cloth-clamp, substantially as described.

6. The cloth-clamp composed of the under jaw G, the upper forked jaw G', means to force them toward each other, and a foot and a spring-plate, the latter connected adjustably with the forked end of the jaw G', and the foot pivoted to said spring, to operate substantially as described.

7. In a sewing-machine, the shaft and its fast and loose pulleys, and a button-hole mechanism comprising a cloth-moving mechanism, a shipper-lever, and a releasing device connecting the shipper-lever therewith, combined with the shipper-rod, its brake, and the forked arm, and the plate e', connected therewith and adapted to force the loose pulley against the fast pulley, substantially as described.

8. In a sewing-machine, the shaft A', its fast and loose pulleys, the shipper-rod, the shipper-lever, a releasing device engaging such lever, and a cloth-moving mechanism of a button-hole mechanism by which such device is operated, combined with the attached brake, the forked arm, loose plate e' carried by it, and the finger entered loosely into the annular groove of the loose pulley, substantially as described.

9. In a sewing-machine having a button-hole-stitching organism comprising a cloth-mover and means to operate it and a shipper-lever, the shaft A', the fast and loose pulleys, and the shipper-rod and its attached brake and finger, to co-operate as described, with the said pulleys combined with the spring d³, for the purpose set forth.

10. In a sewing-machine having a button-hole-stitching organism comprising a cloth-mover and means to operate it and a shipper-lever, the shaft A', its fast and loose pulleys, the shipper-rod, its attached brake, and means to force the loose pulley against the fast pulley, and the spring d³, shoulder d², and stiffer spring d, combined with the lever b³, to compress the said spring d, and through it the spring d³, substantially as described.

11. In a button-hole sewing-machine, the ratchet-wheel, a pin or projection thereon, and releasing device to hold the lever b³, combined with the said lever b³, the stop-rod, its brake, the fast pulley and shaft to stop the machine at the completion of a button-hole, substantially as described.

12. In a sewing-machine having a button-hole-stitching organism comprising a cloth-mover, and means to operate it and a shipper-lever, the shipper-rod and brake and fast pulley, and the two springs of different strengths separated by a shoulder, combined with means to act upon and compress the stiffer spring, and through it compressing the weaker spring before fully compressing the stronger spring, to operate substantially as described.

13. In a sewing-machine for stitching button-holes, the ratchet-wheel to impart longitudinal feeding movement to the cloth-clamp, and a pawl to move the said ratchet, combined with an arm having a head to disengage the pawl from the ratchet, and with a catch to engage suitable shoulders of the ratchet, to turn the latter by hand, substantially as described.

14. In a button-hole sewing-machine, a cloth mover or clamp, and means to operate it, comprising a ratchet-wheel and pawl, and means to operate the pawl to rotate the ratchet-wheel, combined with a lever, f, to disconnect the pawl and ratchet-wheel, and provided with means for engaging the ratchet-wheel, to admit of manual turning of said wheel, substantially as described.

15. In a button-hole sewing-machine, the needle-bar and eye-pointed needle, and a cloth-clamp to feed the material under the needle, combined with a cord-guide having its center of motion coincident with the axis of the needle, and operating mechanism therefor, substantially as described.

16. In a button-hole sewing-machine, the needle-bar, eye-pointed needle, and cloth-clamp, and means to move the material under the point of the needle, combined with a cord-guide, and means to move the same about the axis of the needle, to thereby place the end of the cord-guide in front of the needle, while both the straight sides of the button-hole slit are being overstitched, and with means to hold the said cord-guide while one side of the said slit is being stitched, and with means to automatically release the said cord-guide at the completion of one side of the button-hole, substantially as described.

17. The lever $h^5$, the carrier and attached cord-guide adapted to be revolved about a center coincident with the eye-pointed needle of the machine, and a spring to turn the carrier and attached cord-guide in one direction, combined with the cloth-clamp, means to move it intermittingly, and with a lever adapted to be operated by the mechanism which operates the cloth-clamp, whereby the carrier and attached cord-guide is released automatically as the further end of the button-hole slit is reached by the needle, substantially as described.

In testimony whereof I have signed my name to this specification in the presence of two subscribing witnesses.

FREELAND W. OSTROM.

Witnesses:
 ISAAC HOLDEN,
 LOUIS H. BAKER.